(12) United States Patent
Brun et al.

(10) Patent No.: US 12,744,964 B2
(45) Date of Patent: Sep. 22, 2026

(54) METHOD AND DEVICE FOR PERSONALIZING GENERIC MULTIMEDIA CONTENT

(71) Applicant: Orange, Issy-les-Moulineaux (FR)

(72) Inventors: Arnaud Brun, Chatillon Cedex (FR); Fabrice Boudin, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/916,310

(22) PCT Filed: Mar. 30, 2021

(86) PCT No.: PCT/FR2021/050556
§ 371 (c)(1),
(2) Date: Sep. 30, 2022

(87) PCT Pub. No.: WO2021/198611
PCT Pub. Date: Oct. 7, 2021

(65) Prior Publication Data

US 2023/0179831 A1 Jun. 8, 2023

(30) Foreign Application Priority Data

Mar. 31, 2020 (FR) ....................................... 2003178

(51) Int. Cl.
*H04N 21/45* (2011.01)
*H04L 67/306* (2022.01)
(Continued)

(52) U.S. Cl.
CPC ....... *H04N 21/4532* (2013.01); *H04L 67/306* (2013.01); *H04L 67/565* (2022.05); *H04N 21/2396* (2013.01)

(58) Field of Classification Search
CPC ............ H04N 21/4532; H04N 21/2396; H04L 67/565; H04L 67/306
See application file for complete search history.

(56) References Cited

U.S. PATENT DOCUMENTS 5,543,851 A * 8/1996 Chang .................... H04N 21/47 348/E7.018
5,900,908 A * 5/1999 Kirkland ............ H04N 21/4355 348/62

(Continued)

OTHER PUBLICATIONS

English translation of the Written Opinion of the International Searching Authority dated Jun. 22, 2021 for corresponding International Application No. PCT/FR2021/050556, filed Mar. 30, 2021.

(Continued)

*Primary Examiner* — James R Sheleheda
(74) *Attorney, Agent, or Firm* — David D. Brush; Westman, Champlin & Koehler, P.A.

(57) ABSTRACT

A method and a device for personalizing generic multimedia content, an access method and a device for providing access to an item of personalized multimedia content, a method for requesting access to an item of generic multimedia content, a terminal implementing the same, and platforms for providing access to multimedia content. The method for personalizing an item of generic multimedia content is triggered by an action on the item of generic multimedia content by a terminal of a user and provides an item of personalized multimedia content on the basis of the generic multimedia content and a profile of the user, the profile of the user being determined prior to the action. Thus, the personalization of an item of generic multimedia content is carried out automatically as soon as a user performs an action on this content, possibly in a manner transparent to the user.

18 Claims, 4 Drawing Sheets

(51) Int. Cl.
*H04L 67/565* (2022.01)
*H04N 21/239* (2011.01)

(56) References Cited

U.S. PATENT DOCUMENTS

| | | | | |
|---|---|---|---|---|
| 11,347,379 | B1* | 5/2022 | Levit | H04N 21/234336 |
| 2005/0166224 | A1* | 7/2005 | Ficco | H04N 21/242 725/35 |
| 2006/0047661 | A1* | 3/2006 | Chowdhury | G06F 16/9574 |
| 2007/0260627 | A1* | 11/2007 | Knittel | H04L 67/306 |
| 2011/0093343 | A1* | 4/2011 | Hatami-Hanza | G06Q 30/0267 707/739 |
| 2013/0335635 | A1* | 12/2013 | Ghanem | G06T 7/277 348/571 |
| 2016/0364397 | A1* | 12/2016 | Lindner | G06F 16/24578 |
| 2016/0373817 | A1* | 12/2016 | Drake | H04N 21/44029 |
| 2017/0180435 | A1* | 6/2017 | Edwards | H04L 65/61 |
| 2017/0310771 | A1* | 10/2017 | Lewis | H04L 63/102 |
| 2018/0225519 | A1* | 8/2018 | Chen | G06V 20/47 |
| 2018/0308375 | A1* | 10/2018 | Mitros | G09B 21/00 |
| 2019/0289362 | A1 | 9/2019 | Kalish | |
| 2023/0179831 | A1* | 6/2023 | Brun | H04N 21/2396 725/46 |

OTHER PUBLICATIONS

Peter Jan Doets, "cm-iptv0549R9—Commercial Case for I&P—cm-iptv0549r9—Commercial Case for I&P", No. 9, Jun. 22, 2010 (Jun. 22, 2010), DVB, Digital Video Broadcasting, C/O EBU—17A Ancienne Route—CH-1218 Grand Saconnex, Geneva—Switzerland Retrieved from the Internet: URL: https://www.dvb.org/resources/restricted/members/documents/CM-IPTV/cm-iptv0549r9%20-%20Commercial%20Case%20for%20I%26P.zip cm-iptv0549r9—Commercial Case for I&P.doc, XP017831054.

International Search Report dated Jun. 10, 2021 for corresponding International Application No. PCT/FR2021/050556, iled Mar. 30, 2021.

Written Opinion of the International Searching Authority dated Jun. 10, 2021 for corresponding International Application No. PCT/FR2021/050556, filed Mar. 30, 2021.

* cited by examiner

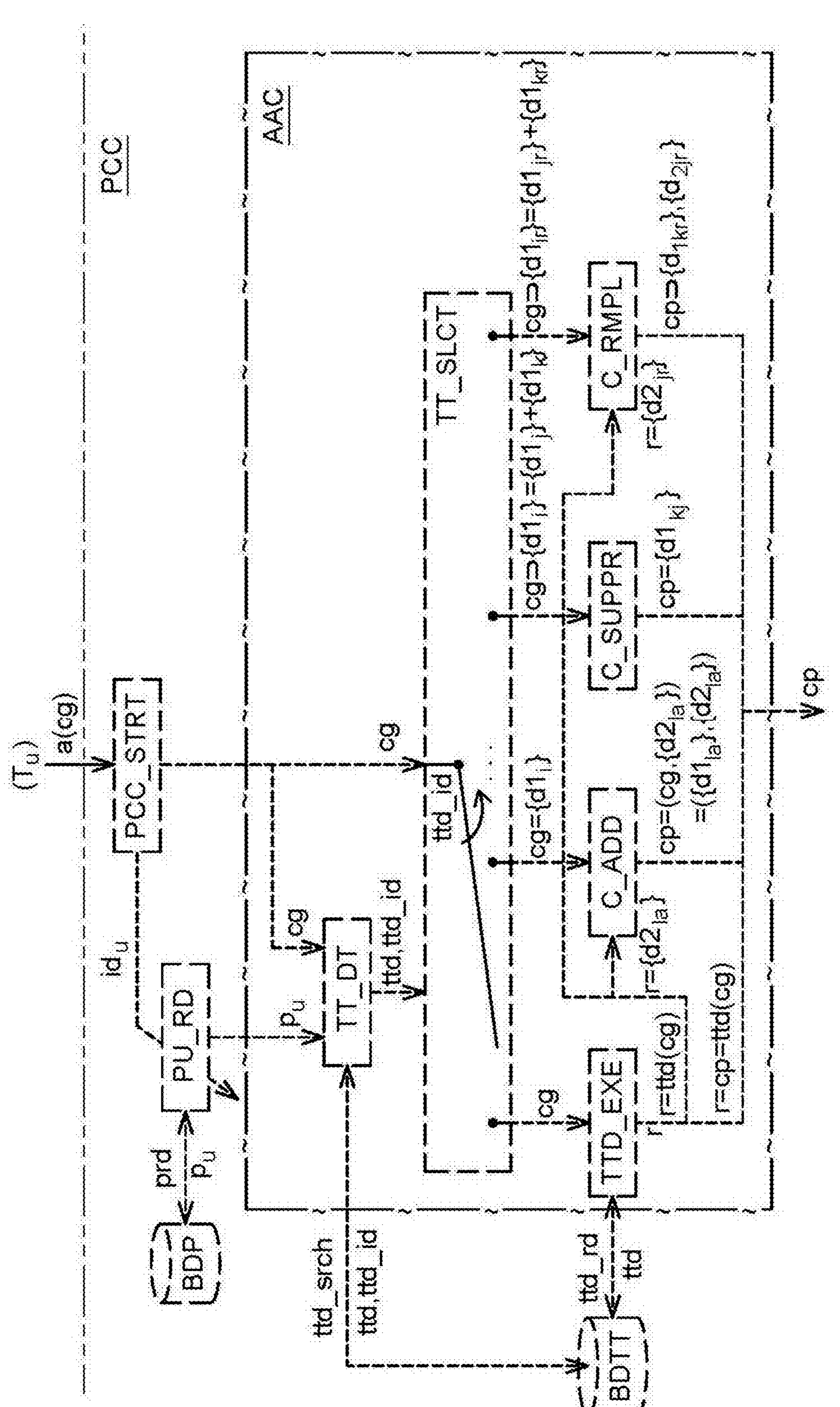
[Fig. 1]

[Fig 2]
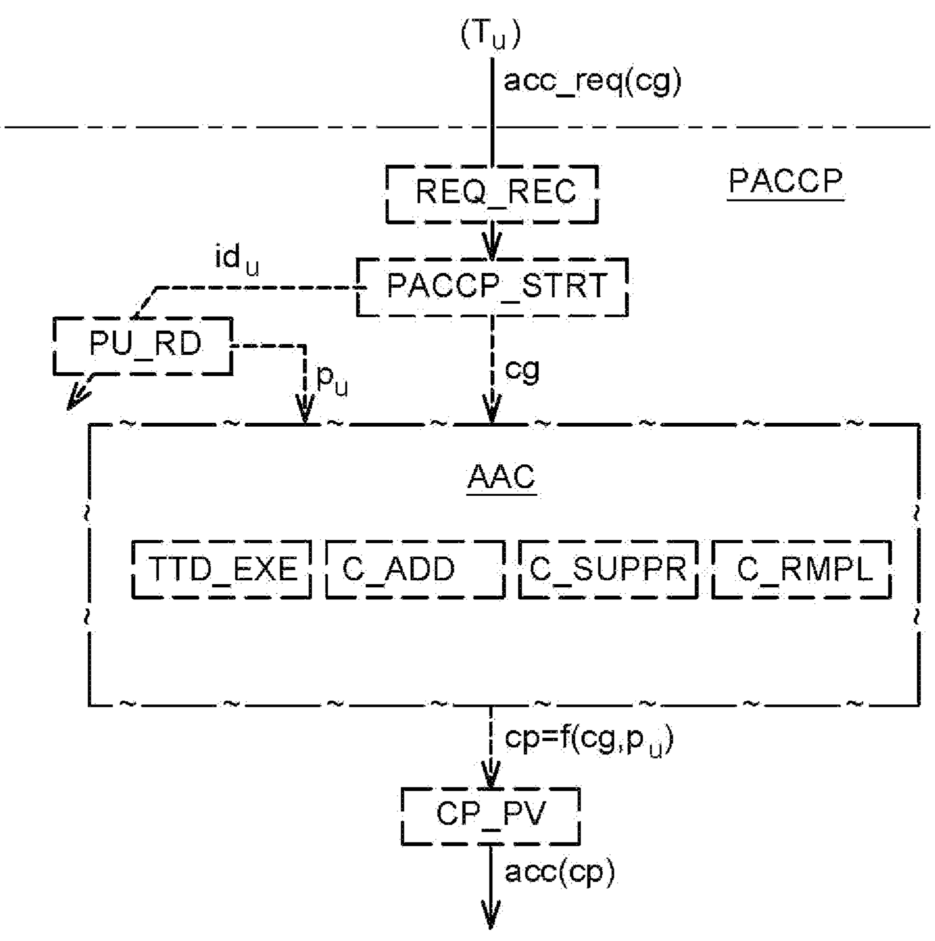

[Fig 3]
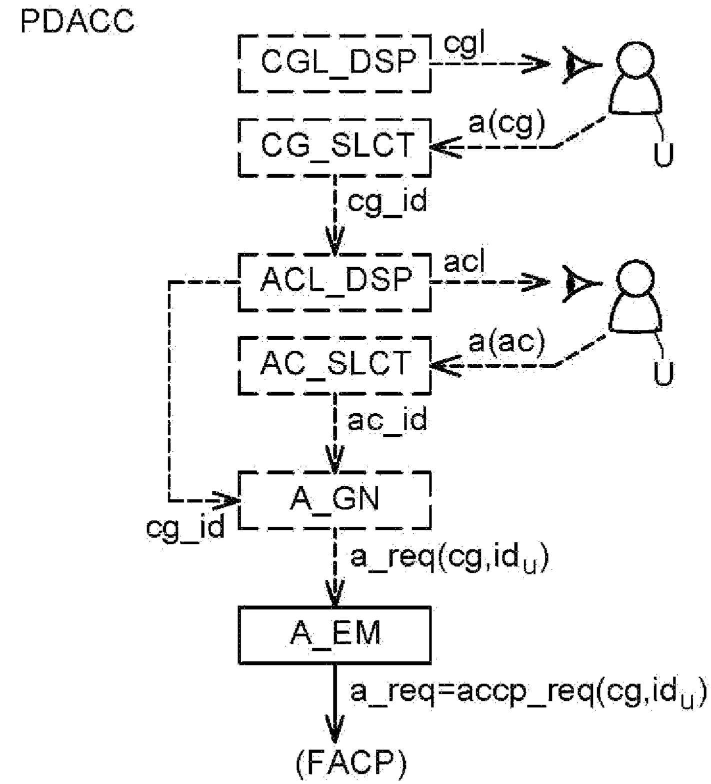
[Fig 4]
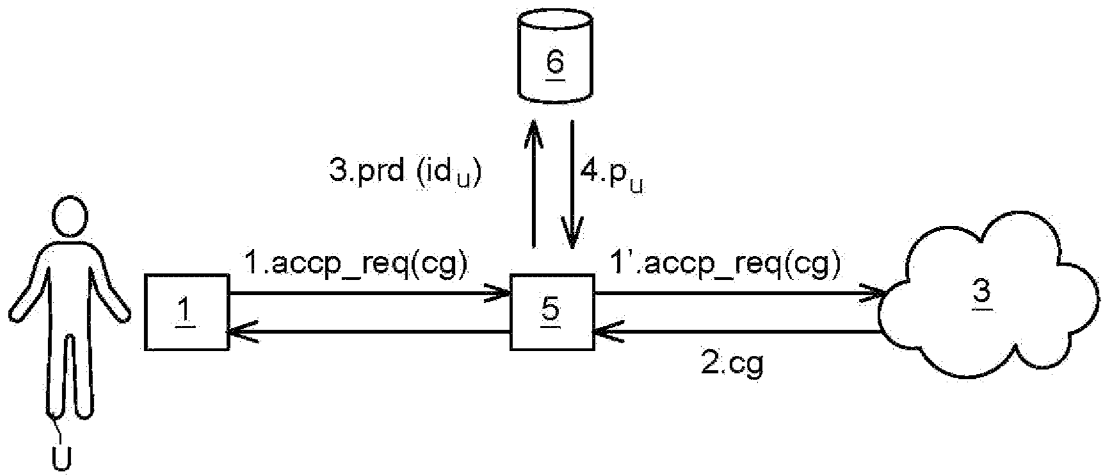

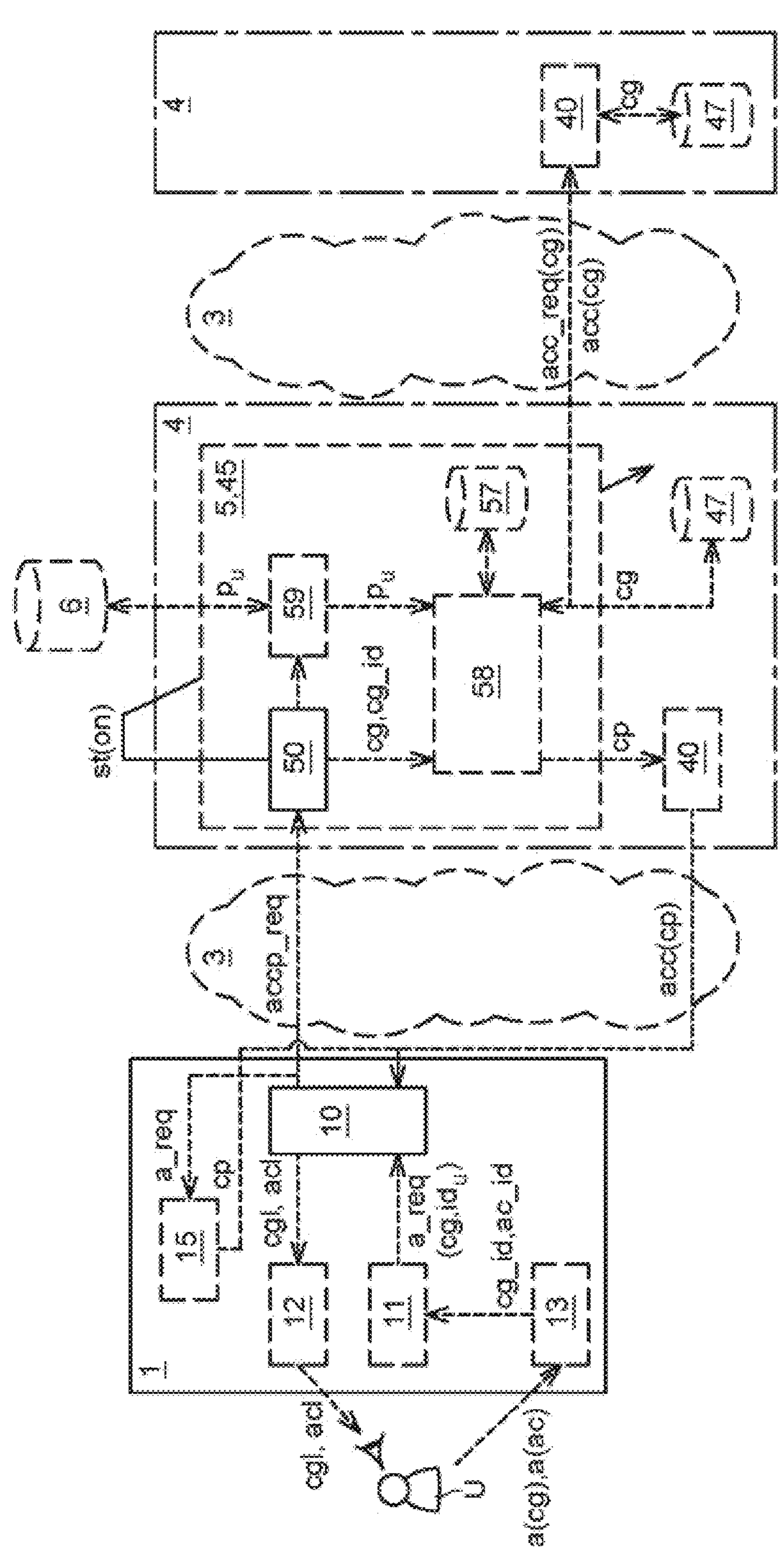
[Fig. 5]

METHOD AND DEVICE FOR PERSONALIZING GENERIC MULTIMEDIA CONTENT

CROSS-REFERENCE TO RELATED APPLICATIONS

This Application is a Section 371 National Stage Application of International Application No. PCT/FR2021/050556, filed Mar. 30, 2021, which is incorporated by reference in its entirety and published as WO 2021/198611 A1 on Oct. 7, 2021, not in English.

TECHNICAL FIELD

The invention relates to a method and a device for personalizing generic multimedia content, an access method and a device for providing access to an item of personalized multimedia content, a method for requesting access to an item of generic multimedia content and a terminal implementing same. In particular, the invention relates to platforms for providing access to multimedia content.

PRIOR ART

Today, when a user accesses an item of multimedia content from a communication terminal, he does so in particular by connecting to a platform accessing multimedia content (for example a media streaming platform such as YouTube™, Netflix™ and so on), a social network (Twitter™, Instagram™ and so on), an Internet site and so on.

Now, it is often the case that the multimedia content being viewed is ill-suited to the user, for example:

- a text written in a language that the user does not know (for example a message posted on Twitter in German about the German football championship, but the user, who is a football fan, does not read German!)
- a video on a subject of interest to the user is accessible on YouTube™ but is intended for experts, which the user is not, or more generally a YouTube™ learning video on a subject intended for secondary school pupils, whereas the user is in primary school!
- an article available on an Internet site but considered too long by the user
- etc.

There are many solutions allowing a user to adapt an item of multimedia content he is accessing, for example:

- translating a text from one language to another
- converting a text using text-to-speech
- generating a summary relating to a text or video
- generating a storyboard or even chaptering of a text or video allowing an overview and/or better navigation of the content.

However, the user needs to make the effort to find these content adaptation tools, configure them to choose the type of adaptation he requires, and apply them to the multimedia content one by one when he encounters a problem with ill-suited content. This is possible only for content which he has on his terminal, not for multimedia content transmitted in the form of streams though.

Moreover, the user may end up not finding the appropriate adaptation tool, or not using the correct adaptation tool for the multimedia content, or incorrectly configuring the adaptation tool. The multimedia content processed by an adaptation tool will thus remain ill-suited to the user.

Generally, the solutions available today are such that multimedia content is and remains ill-suited to the user. The result of this is underuse of available multimedia content or even redundancy of multimedia content. In particular, on collaborative multimedia content platforms, social networks and Internet sites, content is redundant because a user who does not find an appropriate item of multimedia content on a subject is inclined to create his own multimedia content on the subject, thus overloading the platforms, social networks, Internet sites and so on.

Presentation of the Invention

One of the aims of the present invention is to overcome disadvantages/inadequacies of the prior art/to make improvements over the prior art.

One object of the invention is a method for personalizing an item of generic multimedia content, wherein the method for personalizing an item of generic multimedia content is triggered by an action on an item of generic multimedia content by a terminal of a user, the personalization method providing an item of personalized multimedia content on the basis of the generic multimedia content and a profile of the user, the profile of the user being determined prior to the action.

Thus, the personalization of an item of generic multimedia content is carried out automatically as soon as a user performs an action on this content, possibly in a manner transparent to the user. For example, a user requesting access to or asking to read an item of generalized multimedia content will receive in response, respectively, access to or reproduction of an item of personalized multimedia content generated from generalized multimedia content without the user having specifically requested personalization of the generalized multimedia content. In particular, the personalization of generic multimedia content is provided across a method for requesting action on an item of generic multimedia content and a method for acting on this generic multimedia content.

Advantageously, the personalization method comprises automatically adapting the generic multimedia content on the basis of a previously determined profile of the user, the adaptation providing the personalized multimedia content.

Thus, the generic multimedia content is modified by taking account of the profile of the user, for example languages that the user knows, his level of knowledge in the field of the generic multimedia content on which the action has been requested and so on.

Advantageously, the personalization method comprises a determined processing applied to the generic multimedia content, the processing having been determined on the basis of the generic multimedia content and the profile of the user, a result of the processing adapting the generic multimedia content.

Thus, either the adaptation administers a processing on the generic multimedia content in order to modify it to produce personalized multimedia content or the adaptation uses the result of a processing on the generic multimedia content in order to modify it to produce personalized multimedia content.

Advantageously, the adaptation of the generic multimedia content comprises determining the processing on the basis of the generic multimedia content and the profile of the user.

Thus, the determination of the processing on the basis of the profile of the user allows the personalization of the personalized multimedia content to be strengthened and the determination of the processing on the basis of the generalized multimedia content on which the action has been requested allows the processings to be optimized on the basis of the type of generalized multimedia content.

Advantageously, the determination of processing comprises selecting a multimedia content processing from among multiple available processings.

Thus, the administration of a processing may be faster because it is chosen from a catalog of processing available to the personalization method. While the personalization method may also determine any processing accessible via the communication networks, in particular via the Internet, this would require looking for the determined processing in particular by means of a search engine, downloading it and installing it on the device administering the personalization method. This processing determination method allows better optimization of the processings but causes a longer processing time.

Advantageously, the automatic adaptation of generic multimedia content comprises adding second multimedia data to the generic multimedia content, the second multimedia data being generated by a determined processing applied to the generic multimedia content, the determined processing being dependent on the profile of the user.

Thus, the generic multimedia content remains accessible to the user, the second data provide the personalization, for example subtitling in a language that the user knows, a summary at the start of content, the audio version of a text or vice versa and so on.

Advantageously, since the generic multimedia content comprises first multimedia data, the adaptation of the generic multimedia content comprises removing at least part of the first multimedia data, the removed part of the first multimedia data being determined on the basis of the profile of the user.

Thus, the data of the generic multimedia content that are not suited to the user do not impede the readability of the multimedia content for the user: in particular subtitles in an unknown language while the video is in a known language, a long and technical text while the multimedia content starts with a popularized summary and so on.

Advantageously, since the generic multimedia content comprises first multimedia data, the adaptation of the generic multimedia content comprises replacing at least part of the first multimedia data with second multimedia data, the replaced part of the first multimedia data being determined on the basis of the profile of the user, the second multimedia data being generated by a determined processing applied to the generic multimedia content, the determined processing being dependent on the profile of the user.

Thus, subtitling in an unknown language is replaced by subtitling translated into a known language, a longer text is replaced by a summary and so on.

One object of the invention is also a method for accessing an item of personalized multimedia content, wherein the access method is triggered by reception of a request for access to an item of generic multimedia content by a terminal of a user, the access method providing the terminal of the user with access to an item of personalized multimedia content on the basis of the generic multimedia content and a profile of the user, the profile of the user being determined prior to the reception of the access request.

Advantageously, the access method comprises automatically adapting the generic multimedia content on the basis of a previously determined profile of the user, the adaptation providing the personalized multimedia content.

One object of the invention is also a method for requesting access to an item of personalized multimedia content by a terminal of a user, wherein the method for requesting access comprises sending a request for requesting access to an item of personalized multimedia content, the request for requesting access comprising at least one identifier of an item of generic multimedia content and at least one user identifier, the user identifier being associated with a profile of the user, the access request triggering provision of the terminal of the user with the personalized multimedia content on the basis of the generic multimedia content and a profile of the user.

Advantageously, according to one implementation of the invention, the various steps of a method according to the invention are administered by software or a computer program, this software comprising software instructions intended to be executed by a data processor of a device forming part in particular of a device for providing access to an item of multimedia content or of a communication terminal and being designed to control the execution of the various steps of this method.

The invention is therefore also aimed at a program comprising program code instructions in order to execute the steps of the method for personalizing generic multimedia content and/or of the method for accessing an item of personalized multimedia content and/or of the method for requesting access to an item of personalized multimedia content when said program is executed by a processor.

This program may use any programming language and be in the form of source code, object code or intermediate code between source code and object code, such as in a partially compiled form or in any other desirable form.

Another object of the invention is a device for personalizing an item of generic multimedia content, wherein the device for personalizing an item of generic multimedia content comprises a receiver of a command for action on an item of generic multimedia content originating from a terminal of a user U, the received command activating the personalization device, the personalization device providing an item of personalized multimedia content on the basis of the generic multimedia content and a profile of the user, the profile of the user being determined prior to the action.

One object of the invention is, further, a device for providing access to at least one personalized multimedia content, wherein the device for providing access comprises a receiver of requests for access to an item of generic multimedia content by a terminal of a user, the request receiver activating the device for providing access, the device for providing access providing the terminal of the user with access to an item of personalized multimedia content on the basis of the generic multimedia content and a profile of the user, the profile of the user being determined prior to the reception of the access request.

One object of the invention is also a terminal of a user comprising an issuer of a request for requesting access to an item of personalized multimedia content, the request for requesting access comprising at least one identifier of an item of generic multimedia content and at least one user identifier, the user identifier being associated with a profile of the user, the access request triggering provision of the terminal of the user with the personalized multimedia content on the basis of the generic multimedia content and a profile of the user.

BRIEF DESCRIPTION OF THE DRAWINGS

The features and advantages of the invention will become more clearly apparent on reading the description, provided by way of example, and the figures relating thereto, in which:

FIG. 1 shows a simplified diagram of a personalization method according to the invention, FIG. 2 shows a simplified diagram of a method for personalized access to an item of content according to the invention, FIG. 3 shows a simplified diagram of a method for requesting personalized access to an item of content according to the invention, FIG. 4 shows a simplified diagram of an architecture administering the personalization of an item of generalized generic multimedia content according to the invention, FIG. 5 shows a nonexhaustive detailed diagram of an architecture administering the personalization of an item of generalized generic multimedia content according to the invention.

DESCRIPTION OF THE EMBODIMENTS

FIG. 1 shows a simplified diagram of a personalization method according to the invention.

The method for personalizing an item of generic multimedia content PCC is triggered PCC_STRT by an action a on an item of generic multimedia content cg by a terminal of a user $T_U$. The personalization method PCC provides an item of personalized multimedia content cp on the basis of the generic multimedia content cg and a profile of the user $p_U$. The profile of the user $p_U$ is determined prior to the action a.

In particular, the personalization method PCC comprises automatically adapting the generic multimedia content AAC on the basis of a previously determined profile of the user $p_U$. The adaptation AAC provides the personalized multimedia content cp.

There are many solutions allowing an item of multimedia content (text, video, an image and so on) to be adapted, in particular in order to make it more accessible to a user, for example:

translating a text (from one language to another);

converting a text using text-to-speech;

generating a summary relating to a text or video;

etc.

In particular, the personalization method PCC comprises a determined processing TTD_EXE applied to the generic multimedia content cg. The processing ttd has been determined TT_DT on the basis of the generic multimedia content cg and the profile of the user $p_U$. A result of the processing r adapts AAC the generic multimedia content cg.

In particular, the result of the processing r is dependent on the generic multimedia content cg: r=ttd(cg).

In particular, the determined processing is administered TTD_EXE prior to the adaptation AAC (not shown).

In particular, the adaptation AAC comprises administering the determined processing TTD_EXE.

Possibly, the result of the processing r constitutes an item of personalized multimedia content cp: r=cp.

In particular, the result of the processing r is used by the adaptation AAC to provide an item of personalized multimedia content cp.

Possibly, the personalization method PCC comprises administering multiple determined processings TTD_EXE (not shown) in series and/or in parallel. For example, for one and the same item of generic multimedia content, an item of content in voice form may first of all be converted into textual content, then possibly summarized, and translated into a language that the user knows. This presupposes three successive processings: speech-to-text conversion, summary generation, translation, before adapting the multimedia content either by replacing the voice content with the translated textual summary or by adding the translated textual summary to the voice content, which textual summary will be displayed either in parallel with the reproduction of the voice part of the personalized content or prior to the reproduction of the voice part of the personalized content.

In particular, the adaptation of the generic multimedia content AAC comprises determining the processing TT_DT on the basis of the generic multimedia content cg and the profile of the user $p_U$.

In particular, the determination of processing TT_DT is implemented by the adaptation AAC or by the personalization method PCC prior to the adaptation (not shown).

In particular, the determination of processing TT_DT sends a search request tt_srch for searching a processing database BDTT on the basis of at least one criterion established on the basis of the user profile $p_U$ and/or the generic multimedia content cg. In response, the database BDTT provides at least either a processing identifier ttd_id, or an address ttd_lnk at which the processing is available, or a processing ttd and so on.

The determination of processing TT_DT provides the administration of processing TTD_EXE with the data relating to the determined processing, namely, respectively, the identifier of the determined processing ttd_id, the address at which the determined processing is available ttd_lnk, the determined processing ttd and so on.

When the administration of processing TTD_EXE does not receive the determined processing ttd from the determination of processing TT_DT, the administration of processing TTD_EXE requests the processing ttd rd from the processing database BDTT or from another device (not shown), in particular if the determination of processing TT_DT provides an address ttd_lnk, which the ttd provides to the administration of processing TTD_EXE.

In particular, the determination of processing TT_DT comprises selecting a multimedia content processing TT_SLCT from among multiple available processings {BDTT, C_ADD, A_SUPPR, C_RMPL}.

In particular, the automatic adaptation of generic multimedia content AAC comprises adding C_ADD second multimedia data $\{d2_{la}\}$ to the generic multimedia content cg. The second multimedia data $\{d2_{la}\}$ are generated by a determined processing applied TTD_EXE to the generic multimedia content cg: $r=\{d2_{la}\}$. The determined processing ttd is dependent on the profile of the user $p_U$.

In particular, the generic multimedia content cg comprises first multimedia data $\{d1_i\}$: $cg=\{d1_i\}$ or $cg \supset \{d1_i\}$.

When the adaptation AAC adds the second data $\{d2_{la}\}$ to the generic multimedia content cg, the personalized multimedia content cp provided by the adaptation then comprises the first multimedia data $\{d1_i\}$ and the second data $\{d2_{la}\}$: $cp=\{d1_i\}+\{d2_{la}\}$ or $cp \supset (\{d1_i\}, \{d2_{la}\})$.

In particular, since the generic multimedia content cg comprises first multimedia data $\{d1_i\}$, the adaptation of the generic multimedia content AAC comprises removing C_SUPPR at least part of the first multimedia data $\{d1_{js}\}$. The removed part of the first multimedia data $\{d1_{js}\}$ is determined on the basis of the profile of the user $p_U$.

In particular, the generic multimedia content cg comprises at least two parts $\{d1_{js}\}$, $\{d1_{ks}\}$ of first multimedia data $\{d1_i\}$: $cg=\{d1_i\}=\{d1_{js}\}+ \ldots +\{d1_{ks}\}$ or $cg \supset \{d1_i\}=(\{d1_{js}\}, \ldots, \{d1_{ks}\})$.

In particular, since the generic multimedia content cg comprises first multimedia data $\{d1_i\}$, the adaptation of the generic multimedia content AAC comprises replacing C_RMPL at least part of the first multimedia data $\{d1_{jr}\}$ with second multimedia data $\{d2_{jr}\}$. The replaced part of the first multimedia data $\{d1_{jr}\}$ is determined on the basis of the profile of the user $p_U$. The second multimedia data $\{d2_{jr}\}$ are generated by a determined processing ttd applied to the generic multimedia content cg: $r=\{d2_{jr}\}$. The determined processing ttd is dependent on the profile of the user $p_U$.

In particular, the generic multimedia content cg comprises at least two parts $\{d1_{jr}\}$, $\{d1_{kr}\}$ of first multimedia data $\{d1_i\}$: $cg=\{d1_i\}=\{d1_{jr}\}+ \ldots +\{d1_{kr}\}$ or $cg \supset \{d1_i\}=(\{d1_{jr}\}, \ldots, \{d1_{kr}\})$.

When the adaptation AAC adds the second data $\{d2_{jr}\}$ to the generic multimedia content cg by replacing a first part of the first multimedia data $\{d1_{jr}\}$, the personalized multimedia content cp provided by the adaptation AAC then comprises the second part of the first multimedia data $\{d1_{kr}\}$ and the second data $\{d2_{jr}\}$: $cp=\{d1_{kr}\}+\{d2_{jr}\}$ or $cp \supset (\{d1_{kr}\}, \{d2_{jr}\})$.

In particular, the personalization method PCC comprises retrieving PU_RD the profile $p_U$ of the user U of the terminal $T_U$ having performed the action a(cg). In particular, the retrieval of the profile PU_RD is reading the profile from a profile database BDP on the basis of a user identifier id_U or an identifier of the terminal of the user (not shown). This identifier is either provided during the action or requested (not shown) from the terminal of the user $T_U$ by the profile retrieval PU_RD following the activation of the personalization method PCC.

It should be noted that the profile of the user may be either disclosed by the user, or ascertained by learning, or continually updated. In order to ascertain the profile of the user, the invention uses in particular the known techniques of identifying the personality of an individual, or the capabilities and/or preference of the user, etc.

These techniques analyze texts written by a user (his emails, SMS, chats, post, comments they leave on social networks, blogs and other spaces for comments on the Internet, etc.). To describe the personality of an individual, these techniques use empirical models such as those of the "Big 5" described in the article "Language and individual differences: The search for universals in personality lexicons" by L. R. Goldberg, In Wheeler (Ed.), Review of Personality and social psychology, col. 1, 141-165, Beverly Hills, CA: Sage. This model proposed in 1981 allows the personality to be described by using the following five central traits:

- openness: appreciation of art, of emotion, of adventure, of unusual ideas, curiosity and imagination;
- conscientiousness: self-discipline, compliance with obligations, organization rather than spontaneity; goal-oriented;
- extroversion: energy, positive feelings, tendency to look for stimulation and the company of others, go-getter;
- agreeableness: tendency to be sympathetic and cooperative rather than suspicious and antagonistic towards others;
- neuroticism: tendency to easily experience unpleasant feelings such as anger, worry or depression.

This "Big 5" model does not classify people into five categories but evaluates people five times differently, according to these five central traits. For example, each of the five categories may have a corresponding grade (1, 2, 3, 4 or 5). The personality of an individual will therefore be described by 5 different grades (a grade relating to openness, a grade relating to conscientiousness, a grade relating to extroversion, a grade relating to agreeableness and finally a grade relating to neuroticism). Thus, an individual will have a grade ranging from 1 to 5 for the "extroversion" trait depending on his level of extroversion; the minimum grade (1/5) corresponds to a very introverted individual, the maximum grade (5/5) corresponding to a very extroverted individual. The same goes for the other four categories.

Thus, the adaptation AAC of an item of generic multimedia content is dependent for example on:

- the capabilities of the user (for example the languages that he commands);
- the capabilities of the terminal used by the user (for example the type of content supported by the terminal);
- the preferences of the user (for example the types of content that he prefers);
- the personality of the user (very open, tendency to seek company, etc.)
- etc.

One particular embodiment of the personalization method is a program comprising program code instructions for executing the steps of the method for personalizing generic multimedia content when said program is executed by a processor FIG. 2 shows a simplified diagram of a method for personalized access to an item of content according to the invention.

The method for accessing an item of personalized multimedia content PACCP is triggered PACCP_STRT by reception REQ_REC of a request for access to an item of generic multimedia content acc_req(cg) by a terminal of a user $T_U$. The access method PACCP provides the terminal of the user $T_U$ with access acc(cp) to an item of personalized multimedia content cp on the basis of the generic multimedia content cg and a profile of the user $p_U$. The profile of the user $p_U$ is determined prior to the reception of the access request REQ_REC.

In particular, the access method PACCP comprises automatically adapting AAC the generic multimedia content cg on the basis of a previously determined profile of the user $p_U$. The adaptation provides the personalized multimedia content cp: $cp=f(cg, p_U)$.

In particular, the access method PACCP comprises retrieving PU_RD the profile $p_U$ of the user U of the terminal $T_U$ having performed the action a(cg). In particular, the retrieval of the profile PU_RD is reading the profile from a profile database BDP on the basis of a user identifier id_U or on the basis of an identifier of the terminal of the user (not shown). This identifier is either provided during the action or requested (not shown) from the terminal of the user $T_U$ by the profile retrieval PU_RD following the activation of the access method PACCP.

In particular, the access method PACCP comprises administering a determined processing TTD_EXE applied to the generic multimedia content cg. The processing ttd has been determined TT_DT on the basis of the generic multimedia content cg and the profile of the user $p_U$. A result of the processing r adapts AAC the generic multimedia content cg.

In particular, the result of the processing r is dependent on the generic multimedia content cg: r=ttd(cg).

In particular, the determined processing is administered TTD_EXE prior to the adaptation AAC (not shown).

In particular, the adaptation AAC comprises administering the determined processing TTD_EXE. Possibly, the result of the processing r constitutes an item of personalized multimedia content cp: r=cp.

In particular, the result of the processing r is used by the adaptation AAC to provide an item of personalized multimedia content cp.

Possibly, the access method PACCP comprises administering multiple determined processings TTD_EXE (not shown) in series and/or in parallel.

In particular, the adaptation of the generic multimedia content AAC comprises determining the processing TT_DT (not shown) on the basis of the generic multimedia content cg and the profile of the user $p_U$.

In particular, the determination of processing TT_DT is implemented (not shown) by the adaptation AAC or by the access method PACCP prior to the adaptation.

In particular, the automatic adaptation of generic multimedia content AAC comprises adding C_ADD second multimedia data $\{d2_{la}\}$ to the generic multimedia content cg. The second multimedia data $\{d2_{la}\}$ are generated by a determined processing applied TTD_EXE to the generic multimedia content cg: $r=\{d2_{la}\}$. The determined processing ttd is dependent on the profile of the user $p_U$.

In particular, since the generic multimedia content cg comprises first multimedia data $\{d1_i\}$, the adaptation of the generic multimedia content AAC comprises removing C_SUPPR at least part of the first multimedia data $\{d1_{js}\}$. The removed part of the first multimedia data $\{d1_{js}\}$ is determined on the basis of the profile of the user $p_U$.

In particular, since the generic multimedia content cg comprises first multimedia data $\{d1_i\}$, the adaptation of the generic multimedia content AAC comprises replacing C_RMPL at least part of the first multimedia data $\{d1_{jr}\}$ with second multimedia data $\{d2_{jr}\}$. The replaced part of the first multimedia data $\{d1_{jr}\}$ is determined on the basis of the profile of the user $p_U$. The second multimedia data $\{d2_{jr}\}$ are generated by a determined processing ttd applied to the generic multimedia content cg: $r=\{d2_{jr}\}$. The determined processing ttd is dependent on the profile of the user $p_U$.

In particular, the access method PACCP comprises providing access CP_PV to the personalized content cp generated by the adaptation AAC, which transmits acc(cp) the access to the personalized content to the terminal of the user $T_U$ by transmitting either the personalized content cp itself or an access command containing an address at which the personalized content is stored. If the transmission of the access acc(cp) to the personalized content comprises an address, the access method PACCP comprises, prior to the provision of access CP_PV, recording (not shown) the personalized content cp provided by the adaptation AAC in a memory (temporary memory, random access memory, content database and so on).

One particular embodiment of the access method is a program comprising program code instructions for executing the steps of the method for accessing an item of personalized multimedia content when said program is executed by a processor.

The invention consists in adapting AAC, automatically, the generic multimedia content that the user U wishes to view, according to the languages that he knows, his interests, his preferences and his personality.

In the example of use of the invention below, we consider a user U. This user knows a certain number of languages (for example command of French, basic knowledge of English). He has certain "interests" (for example passionate about cinema, limited interest in sport and so on), certain "preferences" (for example types of content that he prefers: video rather than articles, etc.).

This user also has a certain "personality", for example characterized by a certain level of openness (openness to new experiences) or a certain curiosity, etc.

The profile $p_U$ relating to the user U is created prior to the request for personalized access to an item of multimedia content. This profile $p_U$ is stored in a profile database BDP. It contains information relating to the user: the languages that he knows, his interests, his preferences, his personality.

The profile of a user comprises, in particular, a certain number of sections, for example: languages, interests, preferences, personality. Each of these sections is made up of a set of elements (for example the "languages" section is made up of different languages: English, Spanish, French, Italian, Russian). Possibly, each element of the profile has a corresponding grade. This is for example an integer between 0 (minimum) and 5 (maximum).

Thus, in the example in table 1 below, the user U1 has a command of English (maximum grade of 5 out of 5), has very basic knowledge of Spanish (grade of 1 out of 5) and does not know any Italian or Russian at all (minimum grade of 0 out of 5). This same user U1 is very interested in cinema (maximum grade of 5 out of 5) and not at all in politics (minimum grade of 0 out of 5) and so on.

TABLE 1

| | | U1 | U2 | . . . |
|---|---|---|---|---|
| Languages | English | 5 | 1 | |
| | Spanish | 1 | 0 | |
| | French | 5 | 5 | |
| | Italian | 0 | 0 | |
| | Russian | 0 | 3 | |
| | . . . | . . . | . . . | |
| Interests | Cinema | 5 | 2 | |
| | Gardening | 2 | 0 | |
| | Literature | 1 | 4 | |
| | Politics | 0 | 4 | |
| | Sport | 3 | 1 | |
| | . . . | . . . | . . . | |
| References | Text | 5 | 5 | |
| | Images | 5 | 5 | |
| | Sounds | 3 | 2 | |
| | Video | 4 | 4 | |
| | . . . | . . . | . . . | |
| Personality | Openness | 3 | 0 | |
| | Conscientiousness | 4 | 2 | |
| | Extroversion | 3 | 1 | |
| | Agreeableness | 5 | 3 | |
| | . . . | . . . | . . . | |
| . . . | . . . | . . . | . . . | |

We note that the profile of a user U may contain other sections (in addition to the "languages", "interests", "preferences" and "personality" sections) allowing other information relating to the user to be added.

Possibly, during a learning phase P prior to access to an item of content by the user U, the profile of the user U is built (machine learning). This learning phase is in particular carried out by a server that is separate from the devices for providing access 4, or even by a device for providing access 4 or a personalization device 5, 15, 45, as described by FIGS. 4 and 5. It may typically last several days. It consists in analyzing the digital habits of the user: analysis of content viewed by the user (on the Internet, on social networks, on streaming platforms, etc.), analysis of content generated by the user (on social networks, etc.) and more generally analysis of all the digital trails generated by the user when using the Internet and social networks).

This learning phase allows determination of:

the languages that the user knows. These are identified by analyzing content produced by the user (languages of texts written by the user, etc.) and/or by analyzing content viewed most frequently by the user (languages of texts and videos viewed by the user, etc.);

the interests of the user. These are identified by analyzing digital trails produced by the user on social networks (messages, comments, photos, likes, etc.), and/or by analyzing content viewed by the user (articles, videos, etc.);

the preferences of the user (for example preferred types of content: video rather than texts, etc.).

These are identified by analyzing the type of content viewed by the user (the types of content viewed most frequently being considered to be the types of content preferred by the user);

the personality of the user. This is determined by analyzing some of his digital trails: text written by a user (his emails, his SMS, comments he leaves on social networks, etc.);

etc.

Once this learning phase P has ended, the profile of the user $p_U$ is available. We note that, in one variant of the invention, this profile $p_U$ may be continuously updated by continuously analyzing the digital habits of the user, allowing the profile of the user to be refined and the possible trends in the habits of the user over the course of time to be tracked.

Let us suppose that the user U views an item of multimedia content cg from his communication terminal $T_U$ (for example the user clicks on the link of an Internet site corresponding to an article, or clicks on a multimedia message posted on a social network, or else starts a video available on a streaming platform).

Before the chosen content cg (article, multimedia message, video, etc.) is displayed (or played) on the communication terminal $T_U$ of the user, this content cg is automatically adapted AAC, for example in accordance with predefined adaptation rules (R1, R2, . . . RN).

The profile retrieval PU_RD of the personalization method PCC or of the personalized access method PACCP accesses the database BDP containing the profiles of the users ($P_{U1}$, $P_{U2}$, . . . ).

If necessary, the predefined adaptation rules (R1, R2, . . . , RN) are also stored on a database BDTT, indeed on the same database as the profiles (case shown in FIG. 4). These rules (which are modifiable by the operator of the service and by the user) define the adaptations AAC of content that need to be carried out, according to the profile of the user. These rules are automatically generated courtesy of the information available in the profile of the user, at the end of the learning phase. They define the adaptations AAC and the processings TTD_EXE that need to be automatically applied to the content cg that the user U wishes to view.

Examples of adaptations that may thus be carried out (nonexhaustive list):

modification of the length of an item of content (text or video). When the user wishes to access an item of content whose subject is of relatively little interest to the user, the content is shortened: a text will be shortened (generation of an automatic summary) or a video will be shortened (generation of a video composing only the most important sequences). Thus, if for example the user has relatively little interest in politics, he will be offered a condensed content when he accesses an article or video dealing with politics.

translation of a text. When a user wishes to access a textual content written in a language that he does not command, the text will be automatically translated into the language that the user commands best.

addition of subtitles to a video. When the user tries to access a video whose language he does not command, subtitles will be automatically added to the video (subtitles in the language that the user commands best).

addition of definitions or synonyms to a text or video in order to make the content more accessible, in particular access to certain specific words. When the user wishes to access an item of content whose subject is of relatively little interest to the user (we then suppose that the user is not an expert in this subject), a definition will be automatically added for all technical terms (experts' terms, specialized jargon, etc.), in the form of a note at the bottom of the screen, for example. Acronyms will be explained.

filtering of content according to the personality traits of the user. The more "open" (personality trait) the user is, the more he will be presented (and presented fully) with content that departs from his interests, for example when the user accesses an information Internet site (for example the user has very little interest in sport but is particularly "open"; he will therefore have access to sports information). Conversely, the more "close-minded" (personality trait) the user is, the more content that departs from his interests will be shortened, or even removed.

etc.

Possibly, the user may, at any moment (for example via an Internet site):

modify the adaptation rules concerning him;

deactivate one or more adaptation rules concerning him.

FIG. 3 shows a simplified diagram of a method for requesting personalized access to an item of content according to the invention.

The method for requesting access PDACC to an item of personalized multimedia content by a terminal of a user $T_U$ comprises sending A_EM a request for requesting access to an item of personalized multimedia content accp_req. The request for requesting access accp_req comprises at least one identifier of an item of generic multimedia content cg and at least one identifier of the user $id_U$: acc_req(cg,$id_U$). The identifier of the user $id_U$ is associated with a profile of the user $p_U$. The access request accp_req triggers provision of the terminal of the user PACCP with the personalized multimedia content on the basis of the generic multimedia content and a profile of the user.

In particular, the method for requesting access PDACC comprises reproducing CFL_DSP a list of generic content cgl that is intended for a user U. The list of generic content cgl allows the user U to request access to at least one of the items of generic content cg on the list cgl.

In particular, the method for requesting access PDACC comprises the user U selecting CG_SLCT at least one item of generic multimedia content, in particular from a reproduced list of generic content cgl. This selection CG_SLCT possibly results from an action a(cg) of the user U in relation to an item of generic multimedia content cg on the reproduced list of generic content cgl.

In particular, the method for requesting access PDACC comprises reproducing ACL_DSP a list of actions acl that is intended for the user U. The list of actions acl allows the user U to request an action ac (in particular access, reading and so on) on a, possibly previously selected, item of generic multimedia content cg. In particular, the list of actions acl is dependent on the previously selected generic multimedia content cg.

In particular, the method for requesting access PDACC comprises the user U selecting AC_SLCT at least one action, in particular from a reproduced list of actions acl. This selection AC_SLCT possibly results from an action a(ac) of the user U in relation to an action ac on the reproduced list of actions acl.

In particular, the method for requesting access PDACC comprises generating a request for action A_GN on an item of generic multimedia content in particular on the basis of a previously selected item of generic multimedia content cg and/or a previously selected action ac. In particular, the content selection CG_SLCT provides the generation of a request for action A_GN with an identifier of the selected generic multimedia content cg_id. Possibly, the action selection AC_SLCT provides the generation of a request for action A_GN with an identifier of the selected action ac_id. The generation of a request for action A_GN provides the action request a_req(cg,$id_U$), in particular a request for personalized access to an item of content accp_req, for sending A_EM.

One particular embodiment of the method for requesting access is a program comprising program code instructions for executing the steps of the method for requesting access to an item of personalized multimedia content when said program is executed by a processor.

FIG. 4 shows a simplified diagram of an architecture administering the personalization of an item of generalized generic multimedia content according to the invention.

A terminal 1 of a user U is in particular a communication terminal such as a cell phone, a smartphone, a computer or PC, a tablet, etc. The terminal 1 is capable of issuing a request for personalized access to an item of generic multimedia content 1.accp_req(cg) to a device 5 such as a device for providing access to personalized multimedia content or a device for personalizing multimedia content. The device 5 is in particular a server.

The personalization device 5 in particular relays the request for access to the generic multimedia content 1'.accp_req(cg) via a communication network 3 to other devices, servers, content providers (not shown). In particular, the communication network 3 is an Internet network of content made up of social networks and/or content streaming platforms and/or Internet sites, etc. In response to the request for access to the generic multimedia content 1'.accp_req(cg), the network 3 transmits the generic multimedia content 2.cg to the personalization device 5.

To adapt the generic multimedia content cg received, the personalization device 5 queries 3.prd($id_U$), for example, a database 6 storing user profiles. In response, the database 6 transmits the profile of the user $p_U$ to the personalization device 5.

The personalization device 5 is configured to adapt an item of generic multimedia content on the basis of a profile of the user U and a previously determined processing on the basis of the generic multimedia content and/or the profile of the user U.

In particular, the processing is determined on the basis of adaptation rules stored in a rule database.

Possibly, the database 6 also comprises adaptation rules; in this case either the querying 3.prd($id_U$) also relates to the adaptation rule to be applied to the generic multimedia content cg (not shown), or the personalization device 5 later queries the database 6 storing adaptation rules on the basis of the generic multimedia content cg and the user profile $p_U$ that are received. In response, the database 6 transmits the adaptation rule to be applied to the generic multimedia content cg to the personalization device 5.

FIG. 5 shows a nonexhaustive detailed diagram of an architecture administering the personalization of an item of generalized generic multimedia content according to the invention.

The architecture is made up of a terminal 1 of a user U of a personalization device 15, 45, 5, and possibly of a device for providing access to generic multimedia content 4. The various devices 1, 5, 4 are connected directly or via a communication network 3.

The terminal 1 of a user U comprises an issuer 10 of a request for requesting access to a personalized multimedia content accp_req. The request for requesting access accp_req comprises at least one identifier of an item of generic multimedia content and at least one identifier of the user, the identifier of the user being associated with a profile of the user. The request for access accp_req triggers provision of the terminal of the user with the personalized multimedia content on the basis of the generic multimedia content and a profile of the user.

In particular, the terminal 1 comprises a reproduction interface 12, in particular a screen and/or loudspeakers, etc. The reproduction interface 12 in particular allows a list of generic content cgl that is intended for a user U to be reproduced. The list of generic content cgl allows the user U to request access to at least one of the items of generic content cg on the list cgl. Possibly, the reproduction interface 12 allows, in particular besides, a list of actions acl that is intended for the user U to be reproduced. The list of actions acl allows the user U to request an action ac (in particular access, reading and so on) on a, possibly previously selected, item of generic multimedia content cg. In particular, the list of actions acl is dependent on the previously selected generic multimedia content cg.

In particular, the terminal 1 comprises an interaction interface 11 (for example a touchscreen, a keyboard, a mouse, a camera, etc.). The interaction interface 11 in particular allows the user U to select at least one item of generic multimedia content, in particular from a reproduced list of generic content cgl. This selection possibly results from an action a(cg) of the user U in relation to an item of generic multimedia content cg on the reproduced list of generic content cgl. Possibly, the interaction interface 11 allows, in particular besides, the user U to select at least one action, in particular from a reproduced list of actions acl. This selection possibly results from an action a(ac) of the user U in relation to an action ac on the reproduced list of actions acl.

In particular, the terminal 1 comprises a request generator 13 for action, in particular access, on an item of generic multimedia content, in particular on the basis of a previously selected item of generic multimedia content cg and/or a previously selected action ac. In particular, the interaction interface 11 provides the request generator 13 for action with an identifier of the selected generic multimedia content cg_id. Possibly, the interaction interface 11 provides the request generator 13 for action with an identifier of the selected action ac_id. The request generator 13 for action provides the action request a_req(cg,$id_U$), in particular a request for personalized access to an item of content accp_req, to the issuer 10.

The terminal 1 possibly comprises a device 15 for personalizing generic multimedia content. Thus, if the generic multimedia content on which an action has been requested is stored in the terminal 1, this avoids overloads on the communication network 3 to which the terminal 1 is connected, in fact this permits personalization of the same multimedia content when the terminal 1 is not connected to the communication network.

In this case, the issuer 10 transmits the request for personalized access to an item of generic multimedia content accp_req to the personalization device 15, which responds by providing the personalized content cp. The reproduction interface 12 then reproduces the personalized multimedia content cp and not the selected generic multimedia content cg.

The device 5, 15, 45 for personalizing an item of generic multimedia content comprises a receiver 50 of a command for action accp_req on an item of generic multimedia content cg originating from a terminal 1 of a user U. The received command accp_req activates st(on) the personalization device 5. The personalization device 5 provides an item of personalized multimedia content cp on the basis of the generic multimedia content cg and a profile of the user $p_U$. The profile of the user $p_U$ is determined prior to the action.

In particular, the personalization device is:

either a device 5 implemented across the flow between the terminal 1 and a device for providing access to multimedia content 4, or a device 15 implemented in the terminal 1, or a device 45 implemented in a device for providing access to multimedia content 4.

In particular, the personalization device 5, 15, 45 comprises an automatic adapter of the generic multimedia content 58 on the basis of a previously determined profile of the user $p_U$. The adapter 58 provides the personalized multimedia content cp.

In particular, the personalization device 5, 15, 45 comprises a processor (not shown) administering a determined processing applied to the generic multimedia content cg. The processing ttd has been determined on the basis of the generic multimedia content cg and the profile of the user $p_U$. A result of the processing r adapts the generic multimedia content cg.

In particular, the processor administering the determined processing is connected to the input of the adapter 58 (not shown).

In particular, the adapter 58 is capable of administering the determined processing. Possibly, the result of the processing r constitutes an item of personalized multimedia content cp: r=cp.

In particular, the result of the processing r is used by the adapter 58 to provide an item of personalized multimedia content cp.

In particular, the adapter of the generic multimedia content 58 comprises an analyzer capable of determining a processing on the basis of the generic multimedia content cg and the profile of the user $p_U$.

In particular, the analyzer sends a search request tt_srch for searching a processing database 57 on the basis of at least one criterion established on the basis of the user profile $p_U$ and/or the generic multimedia content cg. In response, the database 57 provides at least either a processing identifier ttd_id, or an address ttd_lnk at which the processing is available, or a processing ttd and so on.

The analyzer provides the processor or the adapter 58 with the data relating to the determined processing, namely, respectively, the identifier of the determined processing ttd_id, the address at which the determined processing is available ttd_lnk, the determined processing ttd and so on.

In particular, the automatic adapter of generic multimedia content 58 comprises a data aggregator aggregating second multimedia data $\{d2_{la}\}$ for the generic multimedia content cg. The second multimedia data $\{d2_{la}\}$ are generated by the adapter 58 or the processor from determined processing applied TTD_EXE to the generic multimedia content cg: $r=\{d2_{la}\}$. The determined processing ttd is dependent on the profile of the user $p_U$.

In particular, since the generic multimedia content cg comprises first multimedia data $\{d1_i\}$, the adapter of the generic multimedia content 58 comprises a data subcontractor (not shown) configured to remove at least part of the first multimedia data $\{d1_{js}\}$. The removed part of the first multimedia data $\{d1_{js}\}$ is determined on the basis of the profile of the user $p_U$.

In particular, since the generic multimedia content cg comprises first multimedia data $\{d1_i\}$, the adapter of the generic multimedia content 58 comprises a switch (not shown) configured to replace at least part of the first multimedia data $\{d1_{jr}\}$ with second multimedia data $\{d2_{jr}\}$. The replaced part of the first multimedia data $\{d1_{jr}\}$ is determined on the basis of the profile of the user $p_U$. The second multimedia data $\{d2_{jr}\}$ are generated by a determined processing ttd applied to the generic multimedia content cg: $r=\{d2_{jr}\}$. The determined processing ttd is dependent on the profile of the user $p_U$.

In particular, the personalization device 5, 15, 45 comprises a retriever 59 of the profile $p_U$ of the user U of the terminal $T_U$ having performed the action a(cg). In particular, the retriever 59 of the profile reads the profile from a profile database 6 on the basis of an identifier of the user id_U or an identifier of the terminal of the user (not shown). This identifier is either provided during the action or requested (not shown) from the terminal 1 of the user $T_U$ by the profile retriever 59 following the activation of the personalization device 5, 15, 45.

Possibly, the personalization device 5, 15 uses the communication network 3 to retrieve the generic multimedia content cg from a device for providing access to at least one item of generic multimedia content 4. In particular, the personalization device 5, 15 sends the device for providing access to at least one item of generic multimedia content 4 a request for access to the generic multimedia content acc_req(cg), relaying the request for personalized access accp_req(cg) received by the personalization device 5, 15.

In particular, the device for providing access 4 comprises a transmitter 40 receiving the request for access to the generic multimedia content acc_req(cg). In particular, the device for providing access 4 comprises a content base 47 that stores either the generic multimedia content cg or an address for the generic multimedia content cg.

In response to this request for access acc_req(cg), the device for providing access to at least one item of generic multimedia content 4 uses the communication network 3 to provide the personalization device 5, 15 and in particular the adapter 58 with access to the generic multimedia content acc(cg), said personalization device and adapter using the generic multimedia content cg in particular by modifying it on the basis of the profile of the user $p_U$ in order to provide the personalized multimedia content cp.

In particular, the transmitter 40 provides the personalization device 5, 15 with access to the generic multimedia content acc(cg).

In an alternative architecture to this device for providing access 4 that is separate from the personalization device 5, the personalization device 45 is implemented in the device for providing access 4. Then, the device for providing access 4 is a device for providing access to at least one item of personalized multimedia content. The device for providing access 4 comprises a receiver 50 of requests for access to an item of generic multimedia content by a terminal of a user accp_req(cg).

The request receiver 50 activates st(on) the device for providing access 4. The device for providing access 4 provides the terminal 1 of the user with access to an item of personalized multimedia content acc(cp) on the basis of the generic multimedia content cg and a profile of the user $p_U$, the profile of the user being determined prior to the reception of the access request.

Possibly, the personalization device 45 retrieves the generic multimedia content cg from the device for providing access 4. In particular, the device for providing access 4 comprises a content base 47 that stores either the generic multimedia content cg or an address for the generic multimedia content cg provided to the personalization device 45.

To provide access to the multimedia content, the device for providing access 4 comprises a transmitter 40 capable of providing the terminal 1 with access to the personalized multimedia content acc(cp).

Thus, the invention allows the user to have access to multimedia content that is better suited:

to the languages that he knows;

to his interests;

to his preferences (for example the types of content he prefers: videos rather than articles and so on);

to his personality (for example his level of openness, his curiosity, etc.)

The invention is also aimed at a medium. The information medium may be any entity or device capable of storing the program. For example, the medium may comprise a storage means, such as a ROM, for example a CD ROM or a microelectronic circuit ROM, or a magnetic recording means, for example a floppy disk or a hard disk.

Furthermore, the information medium may be a transmissible medium such as an electrical or optical signal, which may be routed via an electrical or optical cable, by radio or by other means. The program according to the invention may in particular be downloaded from a network, in particular such as the Internet.

Alternatively, the information medium may be an integrated circuit that incorporates the program, the circuit being suitable for carrying out or for being used in carrying out the method in question.

In another implementation, the invention is realized by way of software and/or hardware components. With this in mind, the term module may correspond equally to a software component or to a hardware component. A software component corresponds to one or more computer programs, one or more subroutines of a program or, more generally, to any element of a program or of software that is capable of administering a function or a set of functions in accordance with the above description. A hardware component corresponds to any element of a hardware assembly that is capable of administering a function or a set of functions.

The invention claimed is:

1. A personalization method for personalizing an item of generic multimedia content, wherein the method is implemented by a device and comprises:

in response to a command for action on an item of generic multimedia content by a terminal of a user, the command being a user-initiated command directly on the item of generic multimedia content and selected from the group consisting of a reading command and an access command, providing an item of personalized multimedia content on the basis of the generic multimedia content and a profile of the user, the profile of the user being determined prior to the action; and automatically processing the whole generic multimedia content using an adaptation function based on the profile of the user, which is previously determined, the processing providing the personalized multimedia content and being dynamically selected from a plurality of available processing types based on the profile of the user and the generic multimedia content, the processing comprising at least one of:

summarizing the item of generic multimedia content and presenting the summarized item of generic multimedia content in the personalized multimedia content;

translating textual or spoken language presented in the item of generic multimedia content and presenting the translated text or the translated spoken language in the personalized multimedia content;

defining a textual or spoken word presented in the item of generic multimedia content and presenting the definition in the personalized multimedia content;

converting speech presented in the item of generic multimedia content to text and presenting the text in the personalized multimedia content;

converting text presented in the item of generic multimedia content to speech and presenting the speech in the personalized multimedia content;

creating an audio description of an image or video presented in the item of generic multimedia content and presenting the audio description of the image or video in the personalized multimedia content;

creating a text description of audio presented in the item of generic multimedia content and presenting the text description in the personalized multimedia content; and converting a format of the item of generic multimedia content presenting the converted format of the item of generic multimedia content in the personalized multimedia.

2. The personalization method as claimed in claim 1, wherein the processing is determined on the basis of the generic multimedia content and the profile of the user, a result of the processing adapting the generic multimedia content.

3. The personalization method as claimed in claim 2, comprising adapting the generic multimedia content by determining the processing on the basis of the generic multimedia content and the profile of the user.

4. The personalization method as claimed in claim 3, wherein determining the processing comprises selecting a multimedia content processing from among multiple available processings.

5. The personalization method as claimed in claim 1, wherein the automatic processing of the whole generic multimedia content comprises adding second multimedia data to the generic multimedia content, the second multimedia data being generated by a determined processing applied to the generic multimedia content, the determined processing being dependent on the profile of the user.

6. The personalization method as claimed in claim 1, wherein the generic multimedia content comprises first multimedia data, the processing providing the personalized multimedia content and comprising removing at least part of the first multimedia data, the removed part of the first multimedia data being determined on the basis of the profile of the user.

7. The personalization method according to any claim 1, wherein the generic multimedia content comprises first multimedia data, the processing providing the personalized multimedia content and comprising replacing at least part of the first multimedia data with second multimedia data, the replaced part of the first multimedia data being determined on the basis of the profile of the user, the second multimedia data being generated by the processing applied to the generic multimedia content, the determined processing being dependent on the profile of the user.

8. The personalization method as claimed in claim 1, wherein the processing comprises the summarizing of the item of generic multimedia content and the presenting of the summarized item of generic multimedia content in the personalized multimedia content.

9. The personalization method as claimed in claim 1, wherein the processing comprises the translating of the textual or spoken language presented in the item of generic multimedia content into the translated text and the presenting of the translated text in the personalized multimedia content.

10. The personalization method as claimed in claim 1, wherein the processing comprises the creating of the definition of the textual or spoken word presented in the item of generic multimedia content and the presenting the definition in the personalized multimedia content.

11. The personalization method as claimed in claim 1, wherein the processing comprises the creating of the audio description of the image or video presented in the item of generic multimedia content and the presenting of the audio description of the image or video in the personalized multimedia content.

12. The personalization method as claimed in claim 1, wherein the processing comprises the converting of the text presented in the item of generic multimedia content to speech and the presenting of the speech in the personalized multimedia content.

13. An access method for accessing an item of personalized multimedia content, wherein the access method is implemented by a device and comprises:

receiving a request for access to an item of generic multimedia content by a terminal of a user; and in response to receiving the request, automatically processing the whole generic multimedia content using an adaptation function based on a profile of the user, which is determined prior to reception of the access request, the processing providing personalized multimedia content and being dynamically selected from a plurality of available processing types based on the profile of the user and the generic multimedia content, the processing comprising at least one of:

summarizing the item of generic multimedia content and presenting the summarized item of generic multimedia content in the personalized multimedia content;

translating textual or spoken language presented in the item of generic multimedia content and presenting the translated text or the translated spoken language in the personalized multimedia content; and defining a textual or spoken word presented in the item of generic multimedia content and presenting the definition in the personalized multimedia content;

converting speech presented in the item of generic multimedia content to text and presenting the text in the personalized multimedia content;

converting text presented in the item of generic multimedia content to speech and presenting the speech in the personalized multimedia content;

creating an audio description of an image or video presented in the item of generic multimedia content and presenting the audio description of the image or video in the personalized multimedia content;

creating a text description of audio presented in the item of generic multimedia content and presenting the text description in the personalized multimedia content; and converting a format of the item of generic multimedia content presenting the converted format of the item of generic multimedia content in the personalized multimedia; and providing the terminal of the user with access to the personalized multimedia content on the basis of the generic multimedia content and the profile of the user.

14. A method for requesting access to an item of personalized multimedia content by a terminal of a user, wherein the method for requesting access comprises:

sending a request for requesting access to an item of personalized multimedia content, the request comprising at least one identifier of an item of generic multimedia content and at least one user identifier, the user identifier being associated with a profile of the user, the access request triggering automatically processing the whole generic multimedia content using an adaptation function based on the profile of the user, which is determined prior to the sending of the request, the processing providing personalized multimedia content to the terminal of the user on the basis of the generic multimedia content and the profile of the user and being dynamically selected from a plurality of available processing types based on the profile of the user and the generic multimedia content, wherein the processing is dynamically selected from a plurality of available processing types based on the profile of the user and the generic multimedia content and comprises at least one of:

summarizing the item of generic multimedia content and presenting the summarized item of generic multimedia content in the personalized multimedia content;

translating textual or spoken language presented in the item of generic multimedia content and presenting the translated text or the translated spoken language in the personalized multimedia content;

defining a textual or spoken word presented in the item of generic multimedia content and presenting the definition in the personalized multimedia content;

converting speech presented in the item of generic multimedia content to text and presenting the text in the personalized multimedia content;

converting text presented in the item of generic multimedia content to speech and presenting the speech in the personalized multimedia content;

creating an audio description of an image or video presented in the item of generic multimedia content and presenting the audio description of the image or video in the personalized multimedia content;

creating a text description of audio presented in the item of generic multimedia content and presenting the text description in the personalized multimedia content; and converting a format of the item of generic multimedia content presenting the converted format of the item of generic multimedia content in the personalized multimedia.

15. A non-transitory computer readable medium comprising program code instructions stored thereon in order to execute a method for personalizing an item of generic multimedia content when said program is executed by a processor of a device, wherein the method comprises:

in response to a command for action on an item of generic multimedia content by a terminal of a user, the command being a user-initiated command directly on the item of generic multimedia content and selected from the group consisting of a reading command and an access command, automatically processing the whole generic multimedia content using an adaptation function based on a profile of the user, which is determined prior to the action, the processing providing personalized multimedia content and being dynamically selected from a plurality of available processing types based on the profile of the user and the generic multimedia content, the processing comprising at least one of:

summarizing the item of generic multimedia content and presenting the summarized item of generic multimedia content in the personalized multimedia content;

translating textual or spoken language presented in the item of generic multimedia content and presenting the translated text or the translated spoken language in the personalized multimedia content;

defining a textual or spoken word presented in the item of generic multimedia content and presenting the definition in the personalized multimedia content;

converting speech presented in the item of generic multimedia content to text and presenting the text in the personalized multimedia content;

converting text presented in the item of generic multimedia content to speech and presenting the speech in the personalized multimedia content;

creating an audio description of an image or video presented in the item of generic multimedia content and presenting the audio description of the image or video in the personalized multimedia content;

creating a text description of audio presented in the item of generic multimedia content and presenting the text description in the personalized multimedia content; and converting a format of the item of generic multimedia content presenting the converted format of the item of generic multimedia content in the personalized multimedia; and providing the personalized multimedia content on the basis of the generic multimedia content and the profile of the user.

16. A device for personalizing an item of generic multimedia content, wherein the device comprises:

a receiver for receiving a command for action on an item of generic multimedia content originating from a terminal of a user, the command being a user-initiated command directly on the item of generic multimedia content and selected from the group consisting of a reading command and an access command; and a processor which is configured to trigger, in response to the receiver receiving the command for action, automatically processing the whole generic multimedia content using an adaptation function based on a profile of the user, which is determined prior to receiving the command, the processing providing personalized multimedia content and being dynamically selected from a plurality of available processing types based on the profile of the user and the generic multimedia content, the processing comprising at least one of:

summarizing the item of generic multimedia content and presenting the summarized item of generic multimedia content in the personalized multimedia content;

translating textual or spoken language presented in the item of generic multimedia content and presenting the translated text or the translated spoken language in the personalized multimedia content;

defining a textual or spoken word presented in the item of generic multimedia content and presenting the definition in the personalized multimedia content;

converting speech presented in the item of generic multimedia content to text and presenting the text in the personalized multimedia content;

converting text presented in the item of generic multimedia content to speech and presenting the speech in the personalized multimedia content;

creating an audio description of an image or video presented in the item of generic multimedia content and presenting the audio description of the image or video in the personalized multimedia content;

creating a text description of audio presented in the item of generic multimedia content and presenting the text description in the personalized multimedia content; and converting a format of the item of generic multimedia content presenting the converted format of the item of generic multimedia content in the personalized multimedia; and providing the personalized multimedia content on the basis of the generic multimedia content and the profile of the user.

17. A device for providing access to at least one personalized multimedia content, wherein the device for providing access comprises:

a receiver for receiving a request for access to an item of generic multimedia content by a terminal of a user;

a processor configured to trigger, in response to the receiver receiving the request, automatically processing the whole generic multimedia content using an adaptation function based on a profile of the user, which is determined prior to receiving the access request, the processing providing personalized multimedia content and being dynamically selected from a plurality of available processing types based on the profile of the user and the generic multimedia content, the processing comprising at least one of:

summarizing the item of generic multimedia content and presenting the summarized item of generic multimedia content in the personalized multimedia content;

translating textual or spoken language presented in the item of generic multimedia content and presenting the translated text or the translated spoken language in the personalized multimedia content;

defining a textual or spoken word presented in the item of generic multimedia content and presenting the definition in the personalized multimedia content;

converting speech presented in the item of generic multimedia content to text and presenting the text in the personalized multimedia content;

converting text presented in the item of generic multimedia content to speech and presenting the speech in the personalized multimedia content;

creating an audio description of an image or video presented in the item of generic multimedia content and presenting the audio description of the image or video in the personalized multimedia content;

creating a text description of audio presented in the item of generic multimedia content and presenting the text description in the personalized multimedia content; and converting a format of the item of generic multimedia content presenting the converted format of the item of generic multimedia content in the personalized multimedia; and providing the terminal of the user with access to the personalized multimedia content on the basis of the generic multimedia content and the profile of the user.

18. A terminal of a user comprising:

an issuer configured to transmit a request for requesting access to an item of personalized multimedia content, the request for requesting access comprising at least one identifier of an item of generic multimedia content and at least one user identifier, the user identifier being associated with a profile of the user, the request triggering automatically processing the whole generic multimedia content using an adaptation function based on the profile of the user, which is determined prior to the transmitting of the request, the processing providing personalized multimedia content to the terminal of the user on the basis of the generic multimedia content and the profile of the user and being dynamically selected from a plurality of available processing types based on the profile of the user and the generic multimedia content, wherein the processing comprises at least one of:

summarizing the item of generic multimedia content and presenting the summarized item of generic multimedia content in the personalized multimedia content;

translating textual or spoken language presented in the item of generic multimedia content and presenting the translated text or the translated spoken language in the personalized multimedia content;

defining a textual or spoken word presented in the item of generic multimedia content and presenting the definition in the personalized multimedia content;

converting speech presented in the item of generic multimedia content to text and presenting the text in the personalized multimedia content;

converting text presented in the item of generic multimedia content to speech and presenting the speech in the personalized multimedia content;

creating an audio description of an image or video presented in the item of generic multimedia content and presenting the audio description of the image or video in the personalized multimedia content;

creating a text description of audio presented in the item of generic multimedia content and presenting the text description in the personalized multimedia content; and converting a format of the item of generic multimedia content presenting the converted format of the item of generic multimedia content in the personalized multimedia.

* * * * *